June 2, 1970 D. W. BAXTER ET AL 3,515,877

ELECTRO-OPTICAL POSITIONER

Filed Dec. 13, 1965 2 Sheets-Sheet 1

INVENTORS
DUANE W. BAXTER
PAUL F. HEIDICH
JOHN M. MASSING, DECEASED
BY JOHN W. MASSING, ADMINISTRATOR
CLAUDE B. SMOYER

BY Edward G. Fiorito
ATTORNEY

United States Patent Office 3,515,877
Patented June 2, 1970

3,515,877
ELECTRO-OPTICAL POSITIONER

Duane W. Baxter, Rochester, Minn., Paul F. Heidrich, Mahopac, N.Y., and John M. Massing, deceased, late of Lake Mohegan, Yorktown, N.Y., by John W. Massing, administrator, Mount Hope, W. Va., and Claude B. Smoyer, Webster, N.Y., assignors to International Business Machines Corporation, Armonk, N.Y., a corporation of New York Filed Dec. 13, 1965, Ser. No. 513,618
Int. Cl. G05b *1/01*
U.S. Cl. 250—202 14 Claims

ABSTRACT OF THE DISCLOSURE

An optical positioner is described employing scanners for developing signals which are used to control the position of an object with respect to a frame of reference. The object, which in the embodiment is a microminiaturized electronic circuit chip, is placed on a support table. The support table can be moved in the X and Y directions and can be rotated by suitable positioning motors. The chip is illuminated and the reflected illumination is directed onto the face of a vidicon tube. The vidicon tube includes X and Y deflection coils and generates a plurality of X and Y scanning lines across the image of the chip. The image of the chip on the face of the vidicon tube contains four terminal pads which serve as reference points. A first X scan line is repeatedly generated and the support table containing the chip is incremented downward in the Y direction until the first scan encounters one or both of two terminal pads in the image. When this occurs, a second X scan is generated slightly below the first X scan to determine if the chip had been moved too far downward. If only one of the two terminal pads is scanned, the support table is rotated until both terminal pads in the chip image are encountered by the scan. A somewhat similar arrangement of vertical scanning lines is employed to position the chip in the X direction, however, no rotation is performed. A feedback path including suitable logic circuits is provided between the vidicon tube and the three positioning motors to position the support table and the chip in accordance with the information derived from the scanning lines.

Data processing systems are presently constructed using microminiaturized electronic circuits. The basic circuit is often in the form of a chip less than $^{60}/_{1000}$ of an inch square. Several transistors and diodes are fastened to each chip requiring a positional accuracy of up to two parts in 10,000 (.0002) for product testing, lead attachment and other functions performed during manufacture. Due to the large quantities of these chips employed in each data processing system, positioning of the chips must often be accomplished in less than two seconds.

It is an object of the present invention to provide apparatus for positioning an object with a high degree of accuracy and speed.

Another object of the present invention is to provide improved apparatus for automatically positioning an object.

Still another object of the present invention is to provide improved apparatus for positioning microminiaturized electronic circuit chips rapidly with a high degree of positional accuracy.

These and other objects of the present invention are accomplished by providing a support for the chip which can be moved to anyone of a number of different locations. A scanner searches over the object for a mark producing a signal when it is sensed. The scanner operates along a plurality of rectilinear scan lines separated by predetermined distances.

In operation when the mark is sensed the support member is moved to one of its locations depending upon the particular scanning line in which the mark is sensed. The distances between the scanning lines and the distances between the support locations are proportional. In this manner, the circuit chip may be moved rapidly to the correct position with fewer movements.

In accordance with another aspect of the present invention, the circuit chip is angularly positioned by segmenting one scan line into first and second halves. Two marks are searched for by the scanner. When a mark is sensed in the first half of the scan line, the circuit chip is rotated clockwise, while the sensing of a mark in the second half of the scan line results in a counterclockwise rotation of the circuit chip.

Once marks are sensed in both halves of the scan line, a check is made to determine whether the chip is positioned properly by scanning the chip along another line parallel to the segmented line and spaced away from the segmented line an amount determined by the desired positional accuracy. If no marks are sensed during this second scan, the chip is determined to be positioned accurately.

The foregoing and other objects, features and advantages of the invention will be apparent from the following more particular description of a preferred embodiment of the invention, as illustrated in the accompanying drawings:

Figures 1A, 2:
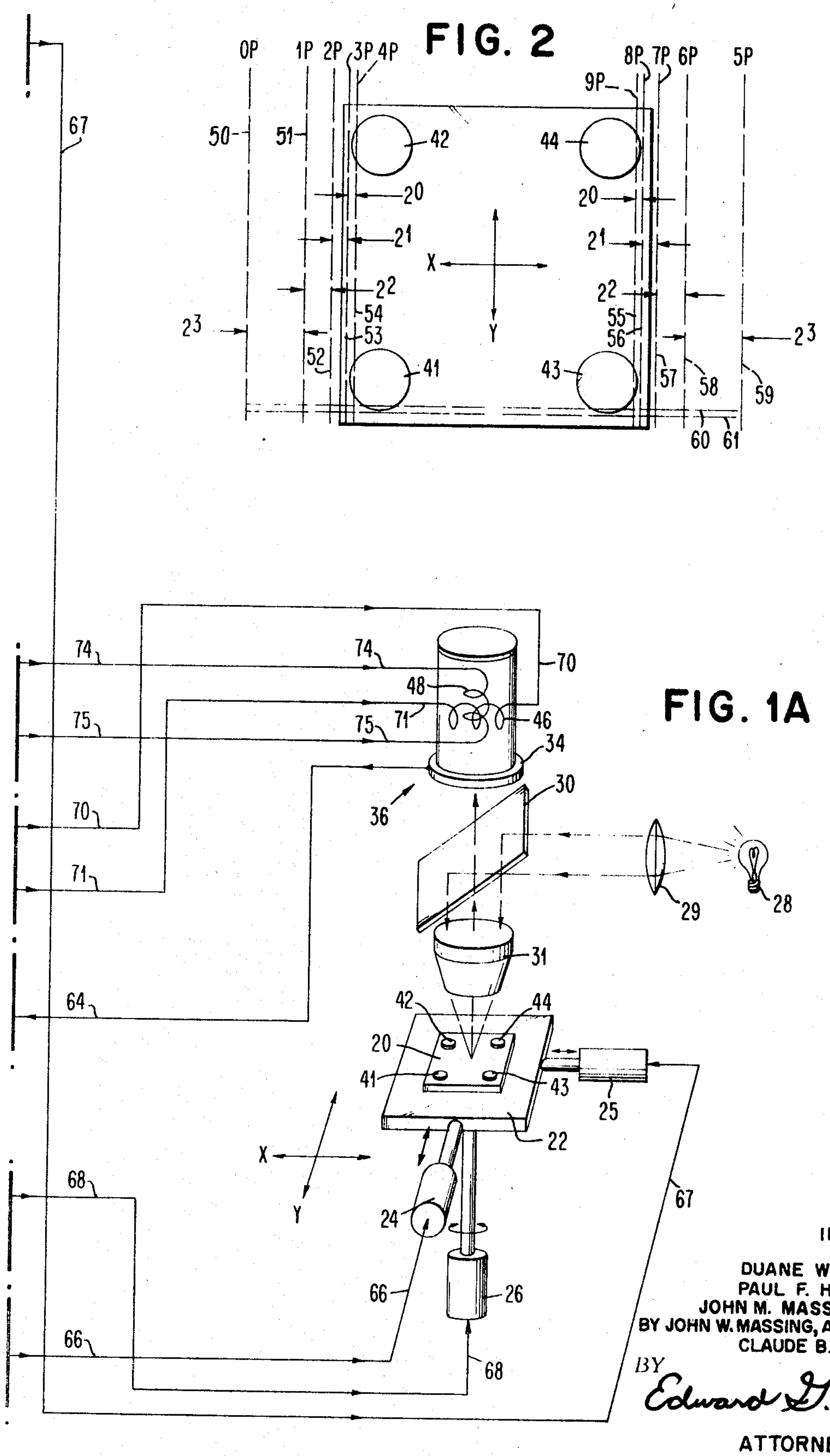
FIG. 1A is a diagram illustrating the mechanical and optical apparatus employed in the present invention.
FIG. 2 is a diagram illustrating the manner in which the optical apparatus in FIG. 1A operates.

The object positioned by the apparatus in FIG. 1A is a microminiaturized electronic circuit chip 20. The actual size of the chip 20 (which may be 60 x 60 mil) is greatly exaggerated. The chip 20 is positioned on a support member 22 which is moved in the Y axis by a motor 24, in the X axis by a motor 25 and angularly by a motor 26.

The chip 20 is illuminated by a light source 28 a condensing lens system 29, a beam splitter 30 and a microscope objective 31. The beam splitter 30 reflects the light down through the microscope objective on to the chip 20. The microscope objective 31 images the light reflected from the chip 20 through beam splitter 30 onto a face 34 of a vidicon 36.

The image produced on the face 34 is represented in FIG. 2 by the chip 20. A group of terminal pads 41–44 appear with different contrast from the chip 20, and are easily recognized by the vidicon 36. The vidicon 36 is provided with an X deflection coil 46, and a Y deflection coil 48. The coils 46 and 48 control the scanning direction on the face 34. A group of scanning lines 50–61 illustrate the various lines along which scanning is directed by the coils 46 and 48.

In operation when the vidicon scans a portion of the face 34 wherein one of the terminal pads 41–44 is located, a signal change is produced on a lead 64. This change in signal is fed back on lead 64 to the control system of FIG. 1B where it is processed. Control signals are fed back to the apparatus of FIG. 1A on one group of leads 66–68, which operate motors 24–25, respectively. Two pairs of leads 70 and 71, and 74 and 75 control the X coil 46 and the Y coil 48, respectively.

GENERAL OPERATION

The procedure followed by the apparatus of FIG. 1A can be generally described with reference to the diagram in FIG. 2. First, alignment along the Y axis, i.e., motion up and down in FIG. 2, is achieved. After this the chip 20 is angularly rotated into the proper position. Then the chip 20 is positioned along the X axis, i.e., sideways motion in FIG. 2.

The scanning sequence begins with scan line 60 in FIG. 2. The chip 20 is shown in the desired position with scan line 60 crossing terminal pads 41 and 43. Normally, prior to alignment, the chip 20 is displaced upward and out of rotational alignment causing the first scan along line 60 to miss pads 41 and 43. The chip 20 is incremented downward in the Y direction and the scan along line 60 once again attempts to find either of the pads 41 or 43. The chip 20 is repeatedly incremented downward in the Y direction and scanning takes place along line 60 after each incremental movement until either pad 41 or pad 43 is sensed. If pad 41 is sensed during the first half of scan line 60, the chip 20 is caused to rotate clockwise a certain amount. If pad 43 is sensed during the second half of the scan line 60, the chip 20 is rotated counterclockwise.

The process continues until both terminal pads 41 and 43 are sensed along line 60. At this time, the current in Y deflection coil 48 is adjusted so that the next scan takes place along line 61. The scan along line 61 performs a check to determine whether either of the pads 41 or 43 have dropped too low along the Y axis in FIG. 2, and are sensed by line 61.

If no signal change is produced by scanning along line 61, the system of FIG. 1A begins alignment of the chip 20 in the X direction. To accomplish this, the vidicon 36 performs a number of scans 50–59 beginning with the scan along line 50. The chip 20 is shown in the correct, or desired position in FIG. 2. Therefore, no pads would be sensed until scan 54. However, if the chip 20 were offset to the left for example, so that line 51 intercepts pads 42 and 41, then correction in the X direction would be required. In this case, after no pads are sensed during scanning along line 50, the vidicon 36 shifts to the scan line 51 which senses pads 41 and 43. The control system of FIG. 1B receives signals on lead 64 and provides a control signal on lead 67 moving the chip 20 to the right a predetermined amount selected to place the chip 20 as close as possible to the correct position shown in FIG. 2.

The vidicon 36 preceeds to scan along line 52. If no pads are sensed along line 52, then scanning takes place along line 53. If one of the pads 41 or 42 is sensed along line 53, the chip is moved to the right again, this time a lesser amount in order to make a finer adjustment in the X direction.

After terminal pads 41 and 42 are sensed along line 54, the vidicon 36 is reset and a scan is taken along line 53 to perform the same check described with reference to line 61. If no pads are sensed along line 53, positioning of the chip 20 is completed.

Where the chip 20 is offset to the right of the correct position shown in FIG. 2, the first signal change occurs during one of the scans 55–59. Following scan line 54, the next search is made along scan line 59 and the same procedure is followed until terminals 43 and 44 are sensed along line 55 and not sensed along line 56 indicating that the chip 20 is properly positioned.

DETAILED DESCRIPTION

Figure 1B:
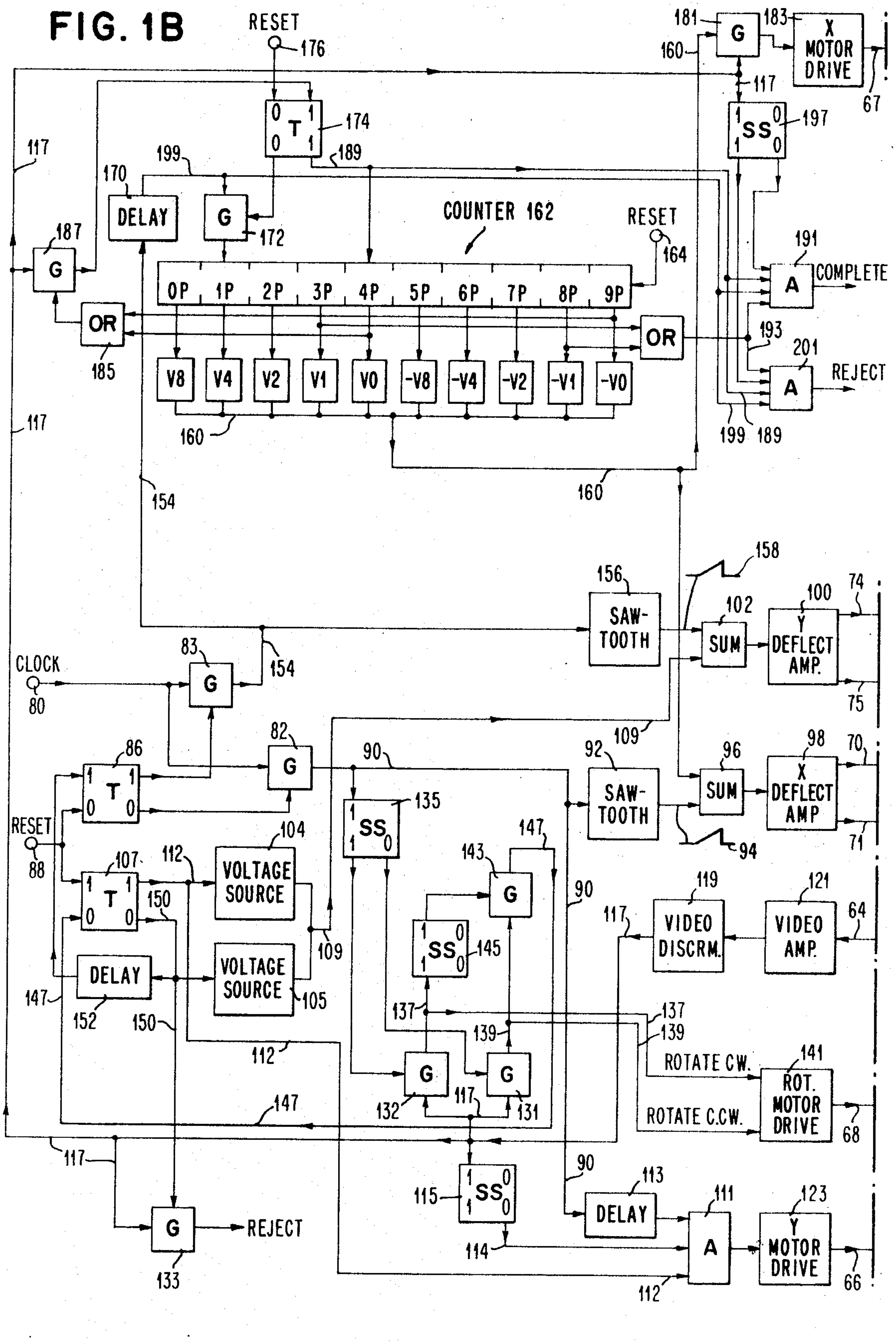
FIG. 1B is a block diagram of a control system for the apparatus of FIG. 1A.

FIG. 1B illustrates one manner of implementing a control system for operating the apparatus of FIG. 1A in accordance with the general description above. Operation is synchronized by a train of clock pulses applied to a terminal 80 connected to the input of a group of gates 82 and 83. Only one or the other of gates 82 and 83 are enabled by the complementary outputs of a trigger 86. Trigger 86 operates in the usual manner. When a signal is applied to the 0 input side, the trigger is set to provide a signal on the 0 output side. In a like manner, when a signal is applied to the 1 input side of thrigger, an output signal level is maintained on the 1 output side.

Initially the trigger 86 is reset to the 0 condition by a signal on the reset terminal 88. This conditions gate 82 to pass clock pulses to a line 90. Alignment in the Y direction and rotational positioning is accomplished by the clock pulses on line 90.

The first clock pulse on line 90 activates sawtooth generator 92 which produces a sawtooth wave shape 94 applied to a summer 96 which in turn applies the sawtooth to a horizontal deflection amplifier 98. The output of amplifier 98 is applied to leads 70 and 71 causing coil 46 to sweep the vidicon 36 across the face 34 in the X direction. This first scan corresponds to line 60 in FIG. 2. The position of line 60 in the Y direction is established by the coil 48 in response to the signals from a Y deflection amplifier 100. A summer 102 couples the signal to amplifier 100 from a pair of voltage sources 104 and 105. One or the other of voltage sources 104 and 105 is activated by a trigger 107 which is initially set into the 1 state by a signal on the reset terminal 88. Voltage source 104 provides the signal on a lead 109 to summer 102 thereby establishing the position of scan line 60 as shown in FIG. 2.

The 1 output of trigger 107 is applied to an input of an AND gate 111 via lead 112. Another input to gate 111 is supplied by a delay circuit 113 which delays the clock pulses on lead 90 an interval equal to the time taken for generator 92 to complete a sweep.

The third and last input to gate 111 is supplied via a lead 114 from a single short multivibrator 115. The single shot operates in a conventional manner providing an output signal on the 0 output side until a signal is applied to the 1 input side, whereupon the signal on the 0 output side drops off and a signal appears on the 1 output side. This condition remains for a certain period of time, one clock cycle in the case of single shot 115, after which the initial condition is resumed. Single shot 115 is set into the 1 state by a signal on a lead 117 from a video discriminator 119 which pulse shapes the output from a video amplifier 121. The video amplifier 121 and discriminator 119 accept the signal change on lead 64 caused by sensing one of the pads 41–44 and produce a pulse on lead 117 each time a terminal pad is sensed.

If no terminal pads are sensed following the first clock pulse on line 90, single shot 115 remains in the 0 state providing an input to AND gate 111 along with trigger 107. The delayed clock pulse on lead 90 is applied to AND gate 111 after the scan is completed. The clock pulse passes through AND gate 111 to a motor drive 123 which advances motor 24 via lead 66.

The second clock pulse on line 90 repeats the same sweep in the X direction. If neither terminal pad 41 nor pad 43 are sensed, the second clock pulse advances motor 24 another increment. The sequence continues until one of the terminal pads 41 or 43 is sensed. At this time, a pulse from the video discriminator 119 is applied via lead 117 to single shot 115 which removes the signal from lead 114 for a period of time equal to one clock cycle, or long enough to block the delayed clock pulse on line 90 causing the chip 20 to remain in the same position.

The pulse on line 117 is also applied to a group of gates 131–133. Gates 131 and 132 perform the function of controlling the direction of rotation of the chip 20. A single shot 135 alternately operates gates 131 and 132. The clock pulse on 90 sets the single shot 135 into the 1 position enabling gate 132 for the first half of each clock cycle. The single shot 135 returns to the 0 position, enabling gate 131 for the second half of each cycle. Therefore, if pad 41 is sensed during the first half of the scan 60 proceeding from left to right, the pulse on lead 117 passes through gate 132 to a lead 137. If pad 43 is sensed during the second half of the clock cycle, the pulse on lead 117 passes through gate 131 to a lead 139.

Leads 137 and 139 are connected to a rotational motor drive 141 causing rotational motor 26 to rotate the chip 20 an incremental amount clockwise for each pulse on lead 137 and the same amount counterclockwise in response to each pulse on lead 139.

A number of scans are taken along line 60 and the rotational position of the chip 20 is corrected each time until both pads 41 and 43 are sensed during the same clock cycle. During the clock cycle, the chip is rotated clockwise one incremental distance and then counterclockwise the same amount returning the chip 20 to the position prior to that clock cycle. A gate 143 and a single shot 145 are used to detect the sensing of both pads 41 and 43 during the same clock cycle. The output of gate 132 is applied to the 1 input side of single shot 145 which supplies an enabling signal to gate 143 for one-half a clock cycle, or sufficiently long to overlap the time when the pulse appears on lead 139 in response to the sensing of terminal pad 43. The pulse passing through gate 143 is applied via a lead 147 to the 0 input side of trigger 107.

With trigger 107 set in the 0 position, voltage source 105 supplies a new voltage via lead 109 to summer 102. Amplifier 100 changes the scanning position of the vidicon 36 causing the next scan to take place along the line 61 in FIG. 2. The next clock pulse on lead 90 initiates a scan along line 61 to determine whether either of the pads 41 or 43 have dropped too low in the Y direction. If either of the pads 41 or 43 are sensed, a pulse on lead 117 passes through gate 133 which is conditioned by trigger 107 now set in the 0 position. The output of gate 133 may signal a reject terminating the operation of the positioner, or may activate apparatus (not shown) moving the chip upward in the Y direction in preparation for a new attempt at alignment in the Y direction and rotational positioning.

If no pads are sensed during scan line 61, the control system of FIG. 1B begins positioning of the chip 20 in the X direction. When trigger 107 switched to the 0 position to initiate the check scan along line 61, the change in voltage level at the 0 output side of trigger 107 is applied via a lead 150 to a delay 152 connected to the 1 input side of trigger 86. Delay 152 delays the signal on lead 150 for one-half cycle, or a time sufficient to complete check scan 61. After this, trigger 86 is set into the 1 position enabling gate 83. The next series of clock pulses on lead 80 passes through gate 83 to a lead 154 which synchronizes the positioning of the chip 20.

The clock pulses on lead 154 is applied to a generator 156 which produces a sawtooth waveform 158 similar to sawtooth waveform 94. Summer 102 receives sawtooth 158 which is superimposed on the voltage from source 105 arriving on lead 109. Summer 102 superimposes the sawtooth waveform 158 on the level of lead 109 applying this combined signal to deflection amplifier 100. This operates to cause an ascending sweep in the Y direction from a base line corresponding to line 61 in FIG. 2. Selection of the location of the scan from among lines 50–59 is accomplished by the voltage on a lead 160 applied to summer 96. The voltage on lead 160 is applied through summer 96 to deflection amplifier 98 which controls the location of the vidicon scan along the X axis. The minimum voltage on lead 160 causes the scan to take place along line 50, while the maximum voltage on lead 160 causes the scan to take place on line 59.

The voltage levels on lead 160 are developed by a group of voltage sources V8, V4, V2, V1, V0, —V8, —V4, —V2, —V1, —V0. The voltage sources V8 through —V0 are operated sequentially by a counter 162 having ten positions 0P through 9P. The counter is initially reset to the 0P position by a signal applied to a reset terminal 164. With counter 162 in the initial condition, voltage source V8 supplies the minimum voltage to lead 160 setting the position of the beam along line 50 in FIG. 2. Therefore, when the amplifier 100 receives sawtooth waveform 158, vidicon 36 scans along line 50. As the counter 162 advances, the next voltage source V4 is activated to supply its associated voltage to lead 160. This operates to cause the vidicon 36 to scan along line 51. The distance between scans 50 and 51 is eight times as large as the distance between scans 53 and 54. Numerical designations are assigned to voltage sources V8 through —V0 corresponding to the magnitude of the voltage changes between them. For this embodiment, the binary progression $2^3$, $2^2$, $2^1$, and $2^0$ is chosen to determine the distances between sources V8 through V1, and sources —V8 through —V1. These distances are labeled in FIG. 2. The distance between scans 50 and 51 is selected to be no larger than the diameter of terminal pads 41–43 so that the pads are not "lost" between scans 50 and 51. The same selection is made with regard to scans 58 and 59.

In operation, the first clock pulse on lead 154 initiates a scan along line 50 and also passes through a delay 170 where it is delayed a sufficient time to permit the scan along line 50 to be completed. A gate 172 receives the output from delay 170. The enabling input to gate 172 is supplied by a trigger 174 initially set into the 0 position. The output from gate 172 steps counter 162 up to position 1P. Voltage source V4 supplies an increased voltage on lead 160 translating the position of the vidicon scan to line 51 in FIG. 2. When the next clock pulse comes through gate 83, sawtooth generator 156 causes the vidicon 36 to sweep up line 51 in FIG. 2. Assuming the chip 20 is translated to the left in FIG. 2 so that at least one of the terminal pads 41 or 42 is sensed by the vidicon along line 51, the pulse appearing on lead 117 is applied to the enabling input of a gate 181. The voltage level on lead 160 passes through gate 181 to a horizontal motor drive 183. The driver 183 compares the voltage level on lead 160 with a reference equal to the voltage of source V0. A signal proportional to the difference therebetween is connected via lead 67 to motor drive 25. Motor 25 is driven an increment equal to seven times the distance between scan lines 54 and 53 in response to the voltage level on lead 160 supplied by voltage source V4. This correction should bring the chip 20 closer to the position shown in FIG. 2. If for example, the first pad sensed occurred when counter 162 which is in the position 2P, motor 25 would then shift the chip 20 an amount equal to three times the distance between scan lines 53 and 54 in response to the voltage supplied by source V2.

Each clock pulse on lead 154 advances the counter 162 after the sweep is completed and correction, if needed, is applied by motor 25. When counter 162 reaches position 4P, the chip 20 should be in the correct position shown in FIG. 2. In order to check the position, the output from position 4P of counter 162 is applied to an OR gate 185 which conditions a gate 187. The first pulse on lead 117 passes through gate 187 and sets trigger 174 into the 1 position. The enabling signal to gate 172 is removed and no further clock pulses can advance counter 162. The transition of trigger 174 from the 0 state to the 1 state is applied via a lead 189 to an input to counter 162 which operates to step the counter down from position 4P to position 3P. When the next clock pulse arrives on lead 154, a scan is initiated along line 53 in FIG. 2. If pads 41 and 42 are not sensed, a chip 20 is considered to be properly aligned in the X direction. An AND gate 191 is employed to determine this condition. One input to AND gate 191 is applied via lead 189 after trigger 174 is switched to the 1 position. Another input is supplied via a lead 193 from an OR gate 195 having an input connected to position 3P of counter 162. A third input to AND gate 191 is applied from the 0 output side of a single shot 197. The single shot 197 remains in the 0 position unless one of the pads 41 or 42 is sensed. The single shot 197 in the latter case is set into the 1 position for a half cycle, or a time of sufficient length to overlap the clock pulse on lead 154 delayed by delay 170, the output of which is connected via lead 199 to the input of AND gate 191.

In operation, if terminal pads 41 and 42 are not sensed during the check scan 53, all four inputs to AND gate 191 are present when the delay clock pulse arrives on lead 199. AND gate 191 produces an output indicating that the positioning of chip 20 is completed.

Another AND gate 201 receives three of the same inputs as AND gate 191, i.e., lead 193, lead 199, and lead 189. The fourth input, however, is taken from the 1 output side of single shot 194. Therefore, AND gate 201 provides an output when either pad 41 or pad 42 is sensed during check scan 53. This indicates that the chip 20 is not aligned within the tolerances desired. The chip may either be rejected or may be translated to the left (by apparatus not shown) in preparation for another attempt at positioning in the X direction.

If the chip 20 is out of position and to the right of the position shown in FIG. 2, terminal pads 41 and 42 are not sensed during scanning along lines 50–54. When the counter 162 is advanced to position 5P, vidicon 36 is caused to scan along line 59 in FIG. 2. If either terminal pad 43 or 44 is sensed along line 59, the same operation takes place as described with reference to lines 50 through 54, except motor drive 183 compares the voltage level on lead 160 to the voltage of source —V0 and causes motor 25 to move chip 20 to the left. The counter 162 continues to advance, correcting the position of chip 20 each time if necessary, until the last position 9P is obtained. The output of position 9P is applied to OR gate 185 and accomplishes the same effect of stepping down counter 162 to position 8P as in the case of position 4P stepped down to position 3P. The output of position 8P is applied to OR gate 195 supplying one input to AND gates 191 and 201 which operate in the same manner as described above.

In summary, what has been shown, is a system for rapidly positioning an extremely small chip 20 with a high degree of accuracy. Alignment in the Y direction is achieved first by a technique which is compatible with the next succeeding step of rotational alignment. Once having established alignment in the Y direction and rotational alignment, a new technique is employed which permits the chip 20 to be moved relatively larger distances in one step, as opposed to a series of smaller increments of equal magnitude.

Further, a convenient check is carried out employing already existing scan lines 53 and 55 which have the dual function of both controlling the amount chip 20 is to be moved, and also performing a tolerance check.

While the distances between the lines 50–59 are determined by a binary progression, other separations could be employed. Also, the distances between scan lines 50 and 56 need not be identical to the increments the chip 20 is moved by motor 25. A proportional relationship need only exist therebetween determined by parameters of the optical system of FIG. 1A including the microscope objective 31.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for positioning an object having at least one recognizable mark thereon, comprising:

positioning means connected to said object for moving said object to one of a plurality of different locations;

scanning means for scanning said object with a scanning beam along a plurality of substantially parallel rectilinear lines spaced from one another and including sensing means providing a signal when said mark is scanned by said scanning beam;

control means connected to said scanning means and responsive to said signal for operating said positioning means to move said object to a selected one of said locations depending upon the particular scanning line in which said mark is sensed.

2. Apparatus as defined in claim 1 wherein the distances between said plurality of locations are proportional to the distances between said rectilinear scan lines.

3. Apparatus as defined in claim 2 wherein the distances between locations and the distances between scan lines are determined by a binary progression.

4. Apparatus as defined in claim 1 wherein said plurality of rectilinear lines include a first and a second line; and second control means responsive to the sensing of a mark in said first line for causing said sensing means to scan said object along said second scan line, and for providing an output when no marks are sensed along said second scan line indicating that the object is positioned to within a tolerance of the separation between said first and second scan lines.

5. Apparatus for positioning an object having at least two recognizable marks thereon, comprising:

translational means connected to said object for moving said object along a certain path;

rotational means connected to said object for rotating said object;

scanning means including sensing means for scanning said object with a scanning beam along a first line having first and second half segments, and for providing a signal when one of said marks is sensed;

first control means connected to said scanning means and said translational means for operating said translational means to move said object in a direction toward said first scan line until a signal is provided by said sensing means;

second control means connected to said scanning means and said rotational means and responsive to said signal for operating said rotational means in a clockwise direction when a mark is sensed only in a first half of said first scan line, and for operating said rotational means in a counterclockwise direction when a mark is sensed only in a second half of said first line.

6. Apparatus as defined in claim 5 wherein said scanning means includes, means for scanning said object along a second line parallel to said first scan line and located on the side of said first scan line away from said object; and third control means connected to said scanning means operated in response to the sensing of a mark along both the first and second halves of said first scan line for causing said scanning means to scan said object along said second scan line and for providing an output when no marks are sensed along said second scan line indicating that the object is positioned to within a tolerance of the separation between said first and second lines.

7. Apparatus as defined in claim 5 further characterized by the addition of positioning means connected to said object for moving said object along a path perpendicular to the path of said translational means to one of the plurality of different locations;

said scanning means including means for scanning said object along a plurality of substantially parallel rectilinear lines spaced from one another and arranged perpendicular to said first line and for providing a signal when one of said marks is sensed;

third control means connected between said scanning means and said positioning means and responsive to the signal from said sensing means for operating said positioning means to move said object to a selected one of said locations depending upon the particular rectilinear scanning line in which said mark is sensed.

8. Apparatus as defined in claim 7 wherein the distances between said plurality of locations is proportional to the distances between said rectilinear scan lines.

9. Apparatus as defined in claim 8 wherein the distances between said locations and between said scan lines are determined by a binary progression.

10. Apparatus as defined in claim 8 wherein said plurality of rectilinear lines includes a third and a fourth line; and fourth control means connected to said scanning means and responsive to the sensing of a mark in said third line for causing said scanning means to scan said object along said fourth line and for providing an output when no marks are sensed along said third line indicating that the object is positioned to within a tolerance of the separation between said third and fourth scan lines.

11. Apparatus as defined in claim 7 further characterized by the addition of positioning means connected to said object for moving said object along a path perpendicular to the path of said translational means to one of a plurality of different locations;

said scanning means including means for scanning said object along a plurality of substantially parallel rectilinear lines spaced from one another and arranged perpendicular to said first line and for providing a signal when one of said marks is sensed;

fourth control means connected to said scanning means and conditioned by the output from said third control means and responsive to the signal from said scanning means for operating said positioning means to move said object to a selected one of said locations depending upon the particular rectilinear scan line in which a mark is sensed.

12. Apparatus as defined in claim 11 wherein the distances between said plurality of locations is proportional to the distances between said rectilinear scan lines.

13. Apparatus as defined in claim 12 wherein the distances between said locations and the distances between said scan lines are determined by a binary progression.

14. Apparatus as defined in claim 12 wherein said plurality of rectilinear scan lines includes a third and a fourth line; and fifth control means responsive to the sensing of a mark in said third line for causing said sensing means to scan said object along said fourth scan line and for providing an output when no marks are sensed along said second scan line indicating that the object is positioned to within a tolerance of the separation between said first and second scan lines.

References Cited

UNITED STATES PATENTS

| | | | |
|---|---|---|---|
| 2,532,063 | 11/1950 | Herbst. | |
| 3,038,369 | 6/1962 | Davis. | |
| 3,039,002 | 6/1962 | Guerth. | |
| 3,230,308 | 1/1966 | Lewczyk | 178—6 X |
| 3,372,266 | 3/1968 | Chilton et al. | 250—203 X |

RONALD L. WIBERT, Primary Examiner
T. R. MOHR, Assistant Examiner

U.S. Cl. X.R.

250—200